Patented Apr. 25, 1950

2,504,984

UNITED STATES PATENT OFFICE 2,504,984

METHOD FOR OBTAINING AMIDES OF POLYHYDROXY ACIDS CONTAINING A SUGAR GROUP

Horace S. Isbell and Harriet L. Frush, Washington, D. C., assignors to the United States of America as represented by the Secretary of Commerce No Drawing. Application August 31, 1948, Serial No. 47,136

11 Claims. (Cl. 260—333)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to ammonia derivatives of the uronic acids. Particularly, the invention relates to a new series of compounds, the glycuronic amides and a method for producing the same. Still more particularly the invention relates to the production of the aldohexuronic amides: mannuronic amide, glucuronic amide, galacturonic amide, and like derivatives.

In the co-pending Isbell and Frush application, Serial No. 47,135, filed August 31, 1948, there is disclosed a method for the preparation of a new series of ammonia derivatives of the uronic acids; the aminoglucuronic amides. These compounds are produced by reacting an ester of uronic acid with an amine reagent such as ammonia, alkyl amines, aryl amines, and the like, whereby —NH$_2$ groups are attached to the glycosidic carbon and the carboxylic carbon to produce aminoglycuronic amides such as 1-aminomannuronic amide, 1-aminogalacturonic amide, 1-aminoglucuronic amide, 1-aminolyxuronic amide, and the like. In one embodiment thereof mannuronic lactone is suspended in methanol and reacted with anhydrous ammonia, and on completion of the reaction the excess solvent and ammonia are separated from the crystalline 1-aminomannuronic amide.

Heretofore attempts to prepare crystalline amides of polyhydroxy acids containing a potential aldehyde group have been unsuccessful.

Accordingly, it is an object of this invention to produce a new series of solid crystalline ammonia derivatives of the uronic acids; the glycuronic amides. It is another object of this invention to provide a method for the production of the aldohexuronic amides: glucuronic amide, galacturonic amide, and mannuronic amide. Other objects and advantages will be apparent or will appear hereinafter.

These objects and advantages are accomplished in accordance with this invention by the method for the production of glycuronic amides which comprises hydrolyzing the glycosidic amino group of an amino glycuronic amide by reacting said amino-amide with an acid, separating the thus produced ammonium salt from said reaction mixture, and recovering the glycuronic amide.

Suitable aminoglycuronic amides for purposes of this invention can be prepared by the methods disclosed in the aforementioned co-pending application of Isbell and Frush and include 1-aminomannuronic amide, 1-aminoglucuronic amide, 1-aminogalacturonic amide, and other aminoglycuronic amides.

The hydrolysis of such amino-glycuronic amides can be carried out by treating the amino-amide with an acid which may be organic or inorganic. However, for reasons of economy and simplicity of operation, acids such as sulfuric and hydrochloric acid are presently preferred. In order to prevent the hydrolysis of the amide group it is necessary to limit the quantity of acid used to not more than one molecular equivalent per mole of amino-amide being hydrolyzed. The hydrolysis reaction of the aminoglycuronic amide results in the formation of an ionic ammonium salt such as the sulfate or chloride.

The by-product ammonium salt can be separated from the hydrolysis reaction mixture by various methods. A convenient method involves forming an insoluble compound with the anionic constituent present and volatilization of the nitrogen base. For example, when sulfuric acid is used to hydrolyze the amino-amide, precipitating the SO$_4$= as an insoluble sulfate of an alkali earth metal followed by distillation to remove the ammonia; or if Cl— is present, as where hydrochloric acid is employed to effect the hydrolysis, the Cl— can be removed as an insoluble chloride such as silver chloride. Another method for removing the ionic constituents involves passing the mixture through or contacting the mixture with a cation exchange resin to remove the cation constituents and then with an anion exchange resin to neutralize the regenerated acid. Suitable cation exchange resins include sulfonic acid high polymers, the sulfonated coals, and resins containing carboxyl groups. The anion exchange resins include the condensation products of phenol and formaldehyde, modified by amination, or by copolymerization with a suitable diamine. In such procedure it is possible to completely hydrolyze the glycosidic amino group with less than one mole equivalent of acid.

If such a method is used to remove the cationic constituent, a very small quantity of acid is preferably added to the material before passing it over the cation exchange resin. The resin decomposes the initially formed ammonium salt, regenerates the acid, which in turn reacts with and hydrolyzes more of the aminoglycuronic amide and concurrently reforms the ammonium salt which in turn reacts with the cationic exchange resin. Thus, a small quantity of acid is sufficient to effect the hydrolysis of a large quantity of an aminoglycuronic amide. The small quantity of acid which remains after such treatment can be removed by precipitation as an insoluble salt or by filtration through an anion exchange resin. The resulting salt-free neutral solution contains a substantially pure glycuronic amide.

The glycuronic amide can be recovered from the solution in crystalline form by concentration of the solution to a syrup from which crystals of the amide will separate. It is possible to increase the yield by the addition to the syrup of an organic solvent in which the glycuronic amide is relatively insoluble. Filtration or other suitable solid-liquid separating means can be employed to recover the crystalline product.

The glycuronic amide can be recrystallized by dissolving it in water, concentrating the solution at a low temperature, as in a vacuum still, until it has formed a syrup, from which crystals of the amide separate. The addition of an organic solvent, say, methanol, in portions to the syrup as crystallization proceeds, facilitates crystallization.

The following examples will show how the invention may be carried out; the invention, however, is not to be construed as limited thereto.

*Example I*

Crude 1-aminomannuronic amide is dissolved in 10 parts of water and 0.2 N-hydrochloric acid is added dropwise until the solution has a pH of 5, ten minutes after the addition of the last portion of acid. This requires substantially one mole of acid per mole of 1-amino-mannuronic amide.

The solution is then passed first over a cation exchange resin, Amberlite IR–100–H (a sulfonic acid high polymer) to remove the ammonium ion, and then over an anion exchange resin, Amberlite IR–4–B (an amino phenolic resin) to remove regenerated acid. The solution so obtained is concentrated at about 40° centigrade to a thick syrup from which mannuronic amide crystallizes. The yield of crystalline mannuronic amide from 10 grams of mannuronic lactone is about 5 grams. Additional product is obtained by working up the mother liquor.

Crystalline mannuronic amide, the product of the present invention, has the formula $C_6H_{11}O_6N$. When heated in a melting point tube it decomposes at 145° to 150° centigrade. The freshly prepared solution exhibits mutarotation with the specific rotation, $[\alpha]_D^{20}$, changing from $+2.4°$ (1.4 minutes) to $-10.4°$ (30 minutes after dissolution). The optical rotation shows that the compound is the alpha pyranose modification and that in water solution it establishes an equilibrium with other modifications.

If it is desired to effect conversion of the aminoglycuronic amide to the free amide with only a small quantity of acid, the procedure in the following Example II is effective.

*Example II*

Ten grams of 1-aminomannuronic amide are dissolved in 100 ml. of water and 1 ml. of 0.2 N-hydrochloric acid is added. The solution is allowed to percolate slowly through a column of cation exchange resin, Amberlite IR–100–H, a phenol-formaldhyde resin with ω-sulfonic acid groups. The resin decomposes the ammonium chloride and regenerates hydrochloric acid, the acid in turn reacts with more of the 1-aminomannuronic amide reforming ammonium chloride which reacts again with the resin. Thus, a small quantity of hydrochloric acid is sufficient to effect the decomposition of a large quantity of the aminoglycuronic amide. The effluent is neutralized by passing it through a column filled with anion exchange resin, Amberlite IR–4–B, a modified amine resin. The resulting neutral solution is evaporated to a syrup from which mannuronic amide crystallizes in good yield.

If it is desired to remove the loosely bound amino group without recourse to ion exchange resins, the following procedure may be used.

*Example III*

Ten grams of 1-aminomannuronic amide are dissolved in 100 ml. of water and the solution is treated with a molecularly equivalent quantity of dilute sulfuric acid added drop by drop, followed by a molecularly equivalent quantity of barium hydroxide solution. The barium sulfate is separated and the solution is evaporated to a thick syrup from which mannuronic amide crystallized in good yield.

*Example IV*

1-aminoglucuronic amide is dissolved in water and the loosely bound amino group is hydrolyzed by reacting the amino-amide with 0.1 equivalent of hydrochloric acid, followed by filtration through a column of a cation exchange resin, Amberlite IR–C–50, a carboxylic acid type cation exchanger. The residual acid in the effluent is removed by filtration through an anion exchange resin, Amberlite IR–4–B, and the solution is concentrated under vacuum at a temperature below 40° centigrade to a thick syrup from which glucuronic amide crystallizes Crystalline glucuronic amide, a product of the present invention, is the hydrate of the alpha pyranose modification. It has the formula $C_6H_{11}O_6N \cdot H_2O$ and melts at 112°–117°, resolidifying, and then melting with decomposition above 150° centigrade. The freshly prepared solution exhibits mutarotation. Thus, the specific rotation, $[\alpha]_D^{20}$, changes from $+78°$ (3 minutes) to $+31.6°$ (18 hours after dissolution). The mutarotation indicates that the substance is the alpha pyranose modification and in water solution establishes an equilibrium state with other modifications.

*Example V*

Ten grams of 1-aminogalacturonic amide are dissolved in 200 ml. of water and 1 ml. of acetic acid is added. The solution is passed in the course of 90 minutes through a column containing a cation exchange resin, Amberlite IR–100–H. The effluent is then concentrated at a temperature of less than 40° centigrade to a syrup. Methanol is added nearly to saturation and the syrup is kept at a temperature of 50° centigrade for several hours. During this time, galacturonic amide crystallizes from the solution. After separation of the crystals from solution, they are purified by dissolving in water, filtering the solution with the aid of a decolorizing carbon and concentrating it at a low temperature in a vacuum still. Methanol is added and the syrup is kept at a temperature of 50° centigrade while crystallization occurs. Crystalline galacturonic amide thus prepared has the formula $C_6H_{11}O_6N$ and melts at 172°–178° centigrade. The freshly prepared solution has a specific rotation, $[\alpha]_D^{20}$ of $+80°$, which changes in the course of 19 hours to +15.7°. This mutarotation is characteristic of alpha pyranose modifications.

If galacturonic amide is crystallized under different conditions, it separates from solution as the monohydrate of the beta pyranose modification. Thus, if galacturonic amide is dissolved in an equal weight of water at 40° centigrade and the solution is allowed to stand for two hours at room temperature to effect conversion to the alpha-beta equilibrium mixture, and ethanol is added to the point of incipient turbidity, the crystals which separate have the formula $C_6H_{11}O_6N \cdot H_2O$. $[\alpha]_D^{20}$ equals $-21°$ (3 minutes), which changes to $+14.6°$ (22 hours after dissolution). In the event that it is desired to separate β-galacturonic amide hydrate from the solution obtained after removal of the ammonium salts from the hydrolyzate of 1-aminogalacturonic amide, it is necessary to concentrate the aqueous solution to a density corresponding to approximating 30 per cent dry substance and then add several volumes of an organic solvent which dissolves in the syrup and renders the product less soluble. Methyl alcohol, ethyl alcohol, isopropyl alcohol, acetone, and dioxane are suitable for this purpose. Crystallization of β-galacturonic amide monohydrate ordinarily begins spontaneously but may be facilitated by the addition of seed crystals.

From the foregoing description and examples, it is apparent that a new series of crystalline ammonia derivatives of the uronic acids has been produced and various methods have been shown for their production.

Since many widely differing embodiments of the invention will occur to one skilled in the art, the invention is not limited to the specific details illustrated and described, and various changes can be made therein without departing from the spirit and scope thereof.

What is claimed is:

1. The method for the production of glycuronic amides having the formula $C_6H_{11}O_6N \cdot nH_2O$ where $n$ is 1 and 0 which comprises hydrolyzing the glycosidic amino group of an amino-aldohexuronic amide by reacting said amide with not more than one molar equivalent of an acid, separating the thus produced ammonium salt from said reaction mixture, and recovering the glycuronic amide.

2. The method for the production of aldohexuronic amides which comprises reacting an aminohexuronic amide with not more than one molar equivalent of an acid, separating the thus formed ammonium salt from the reaction mixture, and recovering the aldohexuronic amide.

3. The method for the production of aldohexuronic amides which comprises treating an aqueous solution of an aminoaldohexuronic amide with not more than one molar equivalent of an acid, separating the thus formed ammonium salt from the reaction mixture, and recovering the aldohexuronic amide.

4. The method for the production of aldohexuronic amides which comprises treating an aqueous solution of an aminoaldohexuronic amide with not more than one molar equivalent of an acid, forming an insoluble salt with the anionic constituent of the thus formed ammonium salt, separating said insoluble salt from the mother liquor, concentrating said mother liquor to a syrup whereby the excess ammonium hydroxide is driven off and a solution of pure aldohexuronic amide is obtained, and separating the crystalline aldohexuronic amide which forms in said syrup.

5. The treatment of 1-aminomannuronic amide by the method of claim 1, whereby mannuronic amide is produced.

6. The treatment of 1-aminoglucuronic amide by the method of claim 1, whereby glucuronic amide is found.

7. The composition of matter: mannuronic amide; $C_6H_{11}O_6N$; melting with decomposition at about 145° to 150° centigrade; $[\alpha]_D^{20}$ changing from $+2.4°$ (1.4 minutes) to $-10.4°$ (30 minutes after dissolution).

8. The composition of matter: glucuronic amide monohydrate; $C_6H_{11}O_6N \cdot H_2O$, melting point 112° to 117° centigrade, and after resolidifying, melting with decomposition above 150° centigrade; $[\alpha]_D^{20}$ changes from $+78°$ (3 minutes) to $+31.6°$ (18 hours after dissolution).

9. The composition of matter: galacturonic amide, $C_6H_{11}O_6N$ melting with decomposition at 172° to 178° centigrade; $[\alpha]_D^{20} = +80°$ (3 minutes); $+15.7°$ (19 hours after dissolution).

10. The composition of matter: galacturonic amide monohydrate, $C_6H_{11}O_6N \cdot H_2O$ melting at 113° to 116° centigrade, and after resolidifying, melting with decomposition at 172° to 178° centigrade. $[\alpha]_D^{20}$ changes from $-21°$ (3 minutes) to $+14.6°$ (22 hours after dissolution).

11. The method for the production of aldohexuronic amide which comprises treating an aqueous solution of an aminoaldohexuronic amide with less than one equivalent of acid passing the solution successively over a cation exchange resin and then over an anion exchange resin, concentrating the effluent to a syrup and separating the crystalline aldohexuronic amide which forms in said syrup.

HORACE S. ISBELL.
HARRIET L. FRUSH.

REFERENCES CITED

The following references are of record in the file of this patent:

UNITED STATES PATENTS

| Number | Name | Date |
|---|---|---|
| 2,380,739 | Evans et al. | July 31, 1945 |